(12) United States Patent
Zhao et al.

(10) Patent No.: US 10,109,432 B1
(45) Date of Patent: Oct. 23, 2018

(54) SWITCH ASSEMBLIES

(71) Applicant: Apple Inc., Cupertino, CA (US)

(72) Inventors: Xiao Ying Zhao, Cupertino, CA (US); Edward S. Huo, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/501,748

(22) Filed: Sep. 30, 2014

Related U.S. Application Data

(60) Provisional application No. 62/012,928, filed on Jun. 16, 2014.

(51) Int. Cl.
*H01H 9/00* (2006.01)
*H01H 1/12* (2006.01)
*H01H 3/04* (2006.01)

(52) U.S. Cl.
CPC ............. *H01H 1/12* (2013.01); *H01H 3/04* (2013.01)

(58) Field of Classification Search
CPC .......................................... H01F 7/14
USPC .................... 335/78; 200/19.36, 404
See application file for complete search history.

(56) References Cited

U.S. PATENT DOCUMENTS

| | | | | |
|---|---|---|---|---|
| 2,273,671 A | * | 2/1942 | Ullberg | H01H 5/02 200/404 |
| 3,051,805 A | * | 8/1962 | Binford | G01F 1/28 200/84 C |
| 3,056,001 A | * | 9/1962 | Fichter | H01H 5/02 200/404 |
| 3,170,049 A | | 2/1965 | Clavel | |
| 3,273,091 A | * | 9/1966 | Wales, Jr. | H01H 36/0073 200/404 |
| 3,295,023 A | * | 12/1966 | Peras | H01H 77/08 200/181 |
| 3,678,425 A | * | 7/1972 | Holmes, Jr. | H01H 36/0073 335/207 |
| 4,179,593 A | * | 12/1979 | Tsunefuji | H01H 1/245 200/250 |
| 4,296,394 A | * | 10/1981 | Ragheb | H01H 5/02 200/404 |
| 4,300,026 A | | 11/1981 | Bull | |
| 4,319,107 A | * | 3/1982 | Haskins | H01H 11/0031 200/1 TK |
| 4,359,611 A | * | 11/1982 | Haskins | H01H 23/006 200/1 TK |
| 4,395,610 A | * | 7/1983 | Downs | H01H 1/403 200/1 A |
| 4,489,297 A | * | 12/1984 | Haydon | H01H 36/0073 200/404 |
| 4,758,694 A | | 7/1988 | Burdick | |

(Continued)

*Primary Examiner* — Alexander Talpalatski
(74) *Attorney, Agent, or Firm* — Dorsey & Whitney LLP

(57) ABSTRACT

A switching assembly can include a lever arm that is magnetically attached to at least a portion of a base plate. A contact may be positioned in a spaced apart and above one end of the lever arm. Alternatively, the contact may be included in the base plate. Another switching assembly can include a movable element adapted to electrically connect with a contact in the switch assembly and a guide a guide having a geometry that directs the element along a first travel path to the contact and a second travel path away from the contact. A geometry of the guide is based on a first displacement curve that is associated with the first travel path and on a second displacement curve that is associated with the second travel path.

25 Claims, 11 Drawing Sheets

(56) References Cited

U.S. PATENT DOCUMENTS

| | | | |
|---|---|---|---|
| 5,216,396 A * | 6/1993 | Stahly | H01H 50/14 |
| | | | 335/128 |
| 5,559,311 A | 9/1996 | Gorbatoff | |
| 5,692,044 A * | 11/1997 | Hughes | H04M 1/236 |
| | | | 200/339 |
| 5,813,520 A | 9/1998 | Reier et al. | |
| 5,969,309 A | 10/1999 | Nishimura et al. | |
| 6,040,748 A * | 3/2000 | Gueissaz | H01H 1/0036 |
| | | | 200/281 |
| 6,538,539 B1 * | 3/2003 | Lu | H01H 3/46 |
| | | | 200/331 |
| 6,642,459 B2 * | 11/2003 | Chou | H01H 19/58 |
| | | | 200/11 G |
| 6,759,933 B2 * | 7/2004 | Fallak | G05G 1/10 |
| | | | 200/404 |
| 6,849,817 B2 * | 2/2005 | Takata | H01H 25/008 |
| | | | 200/1 B |
| 6,965,087 B2 | 11/2005 | Wolber et al. | |
| 7,164,091 B2 | 1/2007 | Lu | |
| 7,264,170 B2 | 9/2007 | Lee et al. | |
| 7,532,096 B2 | 5/2009 | Zindler | |
| 8,284,003 B2 * | 10/2012 | Klossek | G05G 5/05 |
| | | | 335/205 |
| 8,581,679 B2 * | 11/2013 | Min | H01H 1/0036 |
| | | | 200/181 |
| 8,604,372 B2 | 12/2013 | Yang et al. | |
| 8,853,574 B2 | 10/2014 | Christophy et al. | |
| 8,981,245 B2 | 3/2015 | Dinh et al. | |
| 2002/0050880 A1 * | 5/2002 | Ruan | G02B 26/0841 |
| | | | 335/78 |
| 2012/0075199 A1 | 3/2012 | Hsieh | |

* cited by examiner

SWITCH ASSEMBLIES

CROSS-REFERENCE TO RELATED APPLICATION

This application is a nonprovisional patent application of and claims the benefit to U.S. Provisional Patent Application No. 62/012,928, filed Jun. 16, 2014 and titled "Switch Assemblies," the disclosure of which is hereby enclosed herein by reference in its entirety.

TECHNICAL FIELD

The present invention relates to a switch assembly in an electronic device, and more particularly to a magnetically actuated switch.

BACKGROUND

Many electronic devices include switches that permit a user to interact with the electronic device. For example, a switch can be used to turn the electronic device on and off or to increase or decrease the volume of a speaker. In some electronic devices, opening or closing a switch involves moving at least one component in the switch. Typically, a switch is designed so that the movement of the component when opening or closing the switch conforms to a given force displacement curve. The force displacement curve can characterize the "feel" of the switch to a user. The amount of force need to move the component can comply with a given force displacement curve. Additionally, the user may feel the switch "snap" open or closed at a given point while moving the component, and that snap point is specified in the force displacement curve. In some switches, however, the design of the switch results in the movement of the component conforming to a desired force displacement curve in only one direction. For example, the component can move according to a desired force displacement curve when the user is closing the switch but not when the user is opening the switch.

SUMMARY

Certain embodiments described herein may take the form of a switch assembly, comprising: a base plate; and a lever arm selectably magnetically attached to at least a portion of the base plate; wherein the switch assembly is actuated when the base plate is magnetically attached to the base plate.

Yet other embodiments described herein may take the form of a switch assembly, comprising: a base plate; a lever arm magnetically attached to at least a portion of the base plate; and a contact plate positioned above at least one end of the lever arm, wherein: the switch assembly is unactuated when the lever arm is magnetically attached to the base plate; and an external force pivots the lever arm about a fulcrum when the external force exceeds a magnetic attachment force.

Still other embodiments may take the form of a switch assembly, comprising: a movable element adapted to electrically connect with a contact in the switch assembly; and a guide having a geometry that directs the element along a first travel path to the contact and a second travel path away from the contact; wherein the geometry of the guide is based on a first displacement curve that is associated with the first travel path and on a second displacement curve that is associated with the second travel path; and the movable element moves along the guide in response to a pressure exerted thereon by one or more compliant members.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein provide various switch assemblies for an electronic device. In one embodiment, a switch assembly can include a lever arm that is magnetically attached to at least a portion of a base plate. The switch can be actuated or in a closed state when the lever arm is attached to the base plate, or the switch may be unactuated or in an open state when the lever arm is attached to the base plate. An actuation point of the switch can be positioned substantially at the center of the switch while at least some of the components of the switch assembly are positioned adjacent to the actuation point. For example, some of the components of the switch assembly can be located below the actuation point. Additionally or alternatively, some of the components of the switch assembly may be positioned off to one side of the actuation point. The components of the switching assembly can have any given shape and dimensions. The switching assembly can be designed according to a desired force displacement curve.

In another embodiment, a switch assembly may include a movable element that is adapted to electrically connect with a contact in the switch assembly. A geometry of a guide can direct the element along a first travel path to the contact and along a second travel path away from the contact. The geometry of the guide may be based on a first displacement curve that is associated with the first travel path and on a second displacement curve that is associated with the second travel path. The first and second force displacement curves can be the same curve, or the first and second force displacement curves may be different displacement curves.

Figure 1:
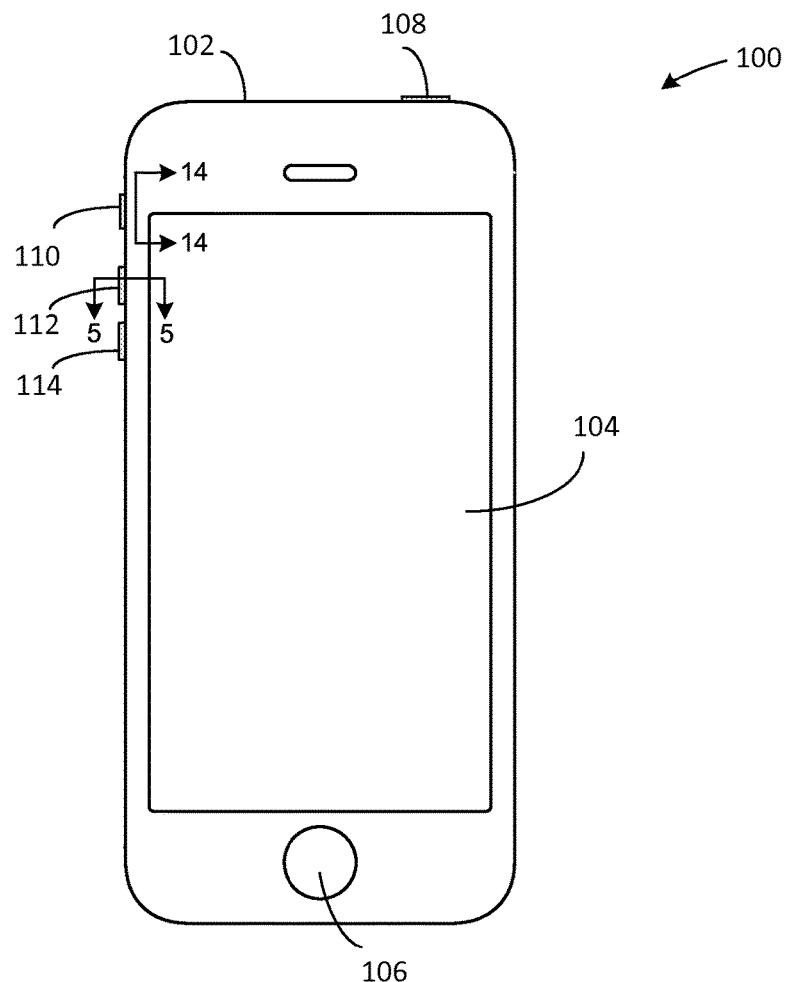
FIG. 1 is a perspective view of an example electronic device that can include one or more switch assemblies.

Referring now to FIG. 1, there is shown a perspective view of one example of an electronic device that can include one or more switch assemblies. In the illustrated embodiment, the electronic device 100 is implemented as a smart telephone. Other embodiments can implement the electronic device differently, such as, for example, as a laptop or desktop computer, a tablet computing device, a gaming device, a digital music player, a wearable communication device, a headset or headphone, and other types of electronic devices that include a switch assembly.

The electronic device 100 includes an enclosure 102 at least partially surrounding a display 104, an input device 106, and switches 108, 110, 112, and 114. The enclosure 102 can form an outer surface or partial outer surface and protective case for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. As one example, the display 104 may be a capacitive multi-touch touchscreen display.

The input device 106 can take the form of a home button, which may be a mechanical button, a soft button (e.g., a button that does not physically move but still accepts inputs), an icon or image on a display, and so on. Further, in some embodiments, the input device 106 can be integrated as part of a cover glass of the electronic device.

The switch 108 may take the form of a hold button that can have one or more functions. As one example, the switch 108 can operate as an on/off switch and a sleep/wake switch.

The switch 110 can take the form of a ringer button. The ringer button may allow a user to place the electronic device in a silent mode, where a telephone ring and notification alerts are muted when telephone calls and emails, texts, posts, reminders, alarms, and other types of messages are received or generated.

The switches 112, 114 may take the form of volume buttons that allow a user to increase or decrease the volume of calls, music, and any other audio playing through the headphone jack or a speaker.

The functions of the input device 106 and switches 108, 110, 112, and 114 are illustrative only. Other embodiments can use the input devices for different functions and/or combinations of functions.

Figure 2:
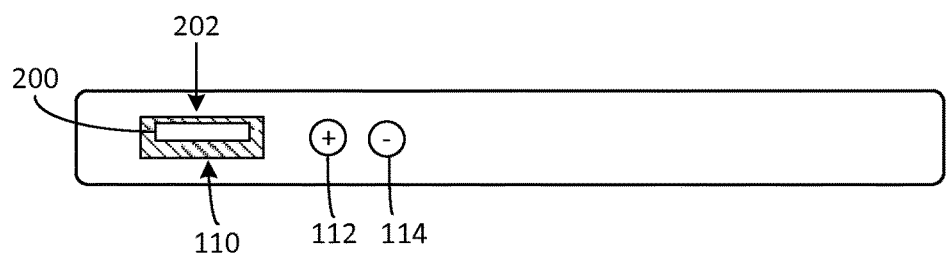
FIGS. 2-3 are side views of the electronic device 100 shown in FIG. 1.
Figure 3:
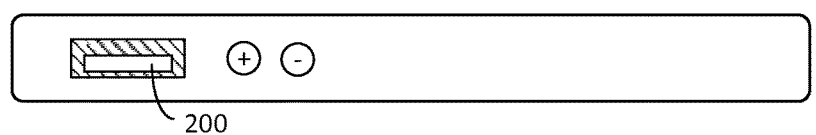

FIGS. 2-3 are side views of the electronic device 100 shown in FIG. 1. The switches 112 and 114 may each be configured as push buttons. A user may press on the switch 112 to increase the volume, and press on the switch 114 to decrease the volume. In some embodiments, the switches 112, 114 are configured as a rocker switch.

The switch 110 can be configured as a toggle switch that when positioned in the top position (FIG. 2), mutes the ringer and alert sounds. When a sufficient downward force is applied to the button 200 (force represented by arrow 202), the toggle switch is positioned in the bottom position (FIG. 3) and the ringer and alert sounds are not muted (i.e., sounds are output through a speaker or headset jack). Other embodiments can construct the switch 110 so that the ringer and alert sounds are muted when the toggle switch is positioned in the bottom position.

Figure 4:
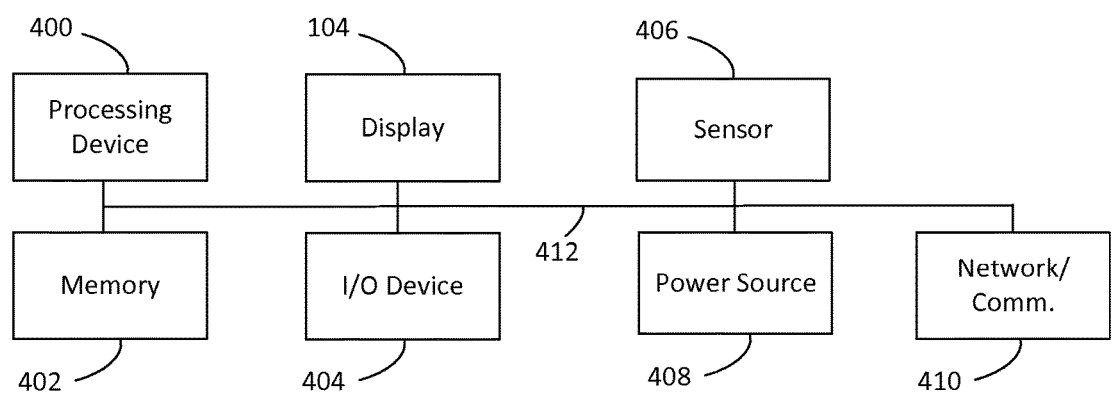
FIG. 4 is an illustrative block diagram of the electronic device 100 shown in FIG. 1.

Referring now to FIG. 4, there is shown an illustrative block diagram of the electronic device 100 shown in FIG. 1. The electronic device 100 can include the display 104, a processing device 400, a memory 402, an input/output (I/O) device 404, a sensor 406, a power source 408, and a network communications interface 410. The display 104 may provide an image or video output for the electronic device 100. The display may also provide an input region for one or more input devices, such as, for example, a touch sensing device and/or a fingerprint sensing device. The display 104 may be substantially any size and may be positioned substantially anywhere on the electronic device 100.

One or more processing devices 400 can control some or all of the operations of the electronic device 100. The processing device 400 can communicate, either directly or indirectly, with substantially all of the components of the electronic device 100. For example, a system bus or signal line 412 or other communication mechanism can provide communication between the processing device 400, the memory 402, the I/O device 404, the sensor 406, the power source 408, and/or the network communications interface 410. The processing device 400 can be implemented as any electronic device capable of processing, receiving, or transmitting data or instructions. For example, the processing device 400 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

One or more memories 402 can store electronic data that can be used by the electronic device 100. For example, a memory can store electrical data or content such as, for example, audio and video files, documents and applications, device settings and user preferences, timing signals, biometric operating system software, and so on. The memory 402 can be configured as any type of memory. By way of example only, the memory can be implemented as random access memory, read-only memory, Flash memory, removable memory, or other types of storage elements, or combinations of such devices.

One or more I/O devices 404 can transmit and/or receive data to and from a user or another electronic device. Examples of an I/O device include the input device 106 and switches 108, 110, 112, 114 (see FIG. 1). Additionally, the I/O device 204 can include a display, a touch sensing input surface such as a track pad, one or more microphones or speakers, one or more ports such as a microphone port, and/or a keyboard.

The electronic device 100 may also include one or more sensors 406 positioned substantially anywhere on the electronic device 100. The sensor or sensors 406 may be configured to sense substantially any type of characteristic, such as but not limited to, images, pressure, light, touch, heat, movement, relative motion, biometric data, and so on. For example, the sensor(s) 406 may be an image sensor, a heat sensor, a light or optical sensor, an accelerometer, a pressure transducer, a gyroscope, a magnet, a health monitoring sensor, and so on.

The power source 408 can be implemented with any device capable of providing energy to the electronic device 100. For example, the power source 408 can be one or more batteries or rechargeable batteries, and/or a connection cable that connects the remote control device to another power source such as a wall outlet.

The network communication interface 410 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

It should be noted that FIG. 4 is illustrative only. In other examples, an electronic device may include fewer or more components than those shown in FIGS. 1 and 4. For example, some of the components shown in FIG. 4 can be implemented in a separate electronic device that is operatively connected to the electronic device 100 through a wired or wireless connection. For example, in some embodiments the display or at least one I/O device can be included in a separate electronic device.

Figure 5:
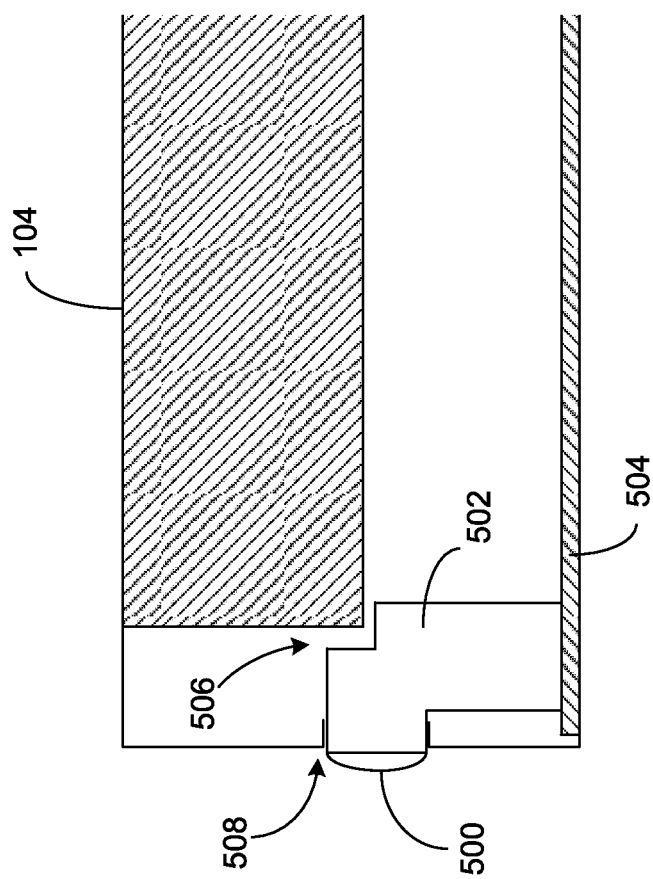
FIG. 5 is a simplified cross-sectional view of the electronic device taken along line 5-5 in FIG. 1.

FIG. 5 is a simplified cross-sectional view of the electronic device taken along line 5-5 in FIG. 1. The cross-sectional view illustrates a simplified switch and a portion of the display 104. Other components are omitted from FIG. 5 for simplicity and clarity. The switch assembly includes a button 500 and an arm 502, with one end of the arm connected to the button 500. The other end of the arm may be positioned on a base plate 504. The switch may be actuated or "closed" when a user presses on the button to cause the end of the arm on the base plate to electrically connect to a contact (not shown).

In some embodiments, a component or combination of components can restrict the construction of the switch assembly. For example, in FIG. 5 the display 104 has a width and a thickness that causes the arm 502 to be offset from the center of the button 500. A corner of the arm 502 is removed to create room for a portion of the display (see area 506). The button may twist when a user pushes on the button, particularly on the center of the button. The twisting can result in a portion of the arm and/or of the button rubbing or striking the enclosure. For example, the button and/or arm may strike the enclosure near region 508 when the user presses on the center of the button. Unsightly marks or streaks may be created when the button and/or arm repeatedly strike the enclosure. Additionally or alternatively, the operation of the switch assembly can be adversely impacted by each strike or after a number of repeated strikes.

Figure 6:
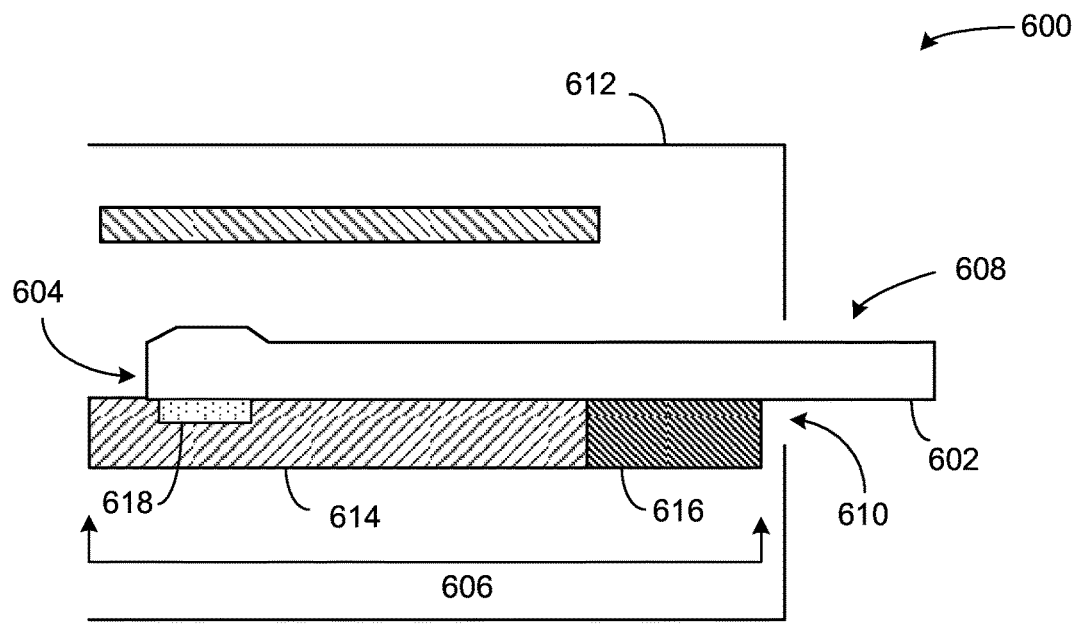
FIGS. 6-7 are cross-sectional views of one example of a switch assembly.
Figure 7:
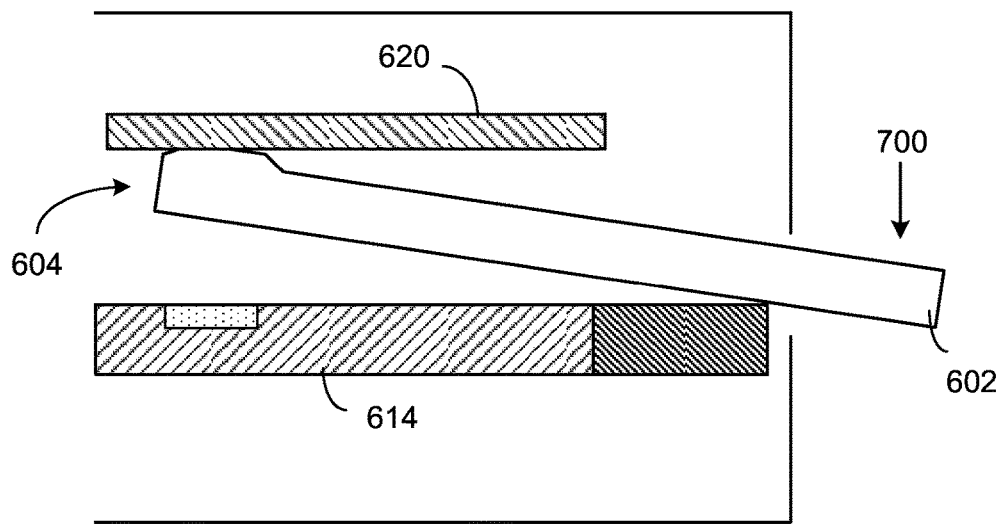

Referring now to FIGS. 6-7, there are shown cross-sectional views of one example of a switch assembly. FIG. 6 depicts the switch assembly in an "open" or unactuated state and FIG. 7 illustrates the switch assembly in a "closed" or actuated state. In some embodiments, the switch assembly 600 can be used in the switch 108 and/or the switches 112, 114 in FIG. 1.

The switch assembly 600 includes a lever arm 602 having one end 604 attached to a base plate 606 and another end 608 extending out of an opening 610 in the enclosure 612. In the illustrated embodiment, the base plate 606 includes a magnetic plate 614 and an electrical ground plate 616. The magnetic plate can include one or more magnets embedded in, or on top of the plate 614. An embedded magnet 618 is shown in FIG. 5. Alternatively, the magnetic plate 614 may be one magnet. The lever arm 602 can be made of a ferrous and conductive material. Thus, when the switch is in the open state, the end 604 of the lever arm 602 is magnetically attached to the magnetic plate 614.

When a force (see arrow 700 in FIG. 7) is applied to the end 608 of the lever arm 602 extending out of the enclosure 612, and the amount of force is sufficient to overcome the magnetic attraction between the lever arm 602 and the magnetic plate 614, the end 604 of the lever arm detaches from the magnetic plate 614 and contacts the contact plate 620. The switch is closed or actuated when the lever arm 602 contacts the contact plate 620. When the force is removed, the lever arm 602 may return to its position on the base plate 606 (i.e., the open state) due at least in part to the magnetic attraction between the lever arm and the magnetic plate 614.

Other embodiments can configure the switch assembly 600 differently. For example, the lever arm 602 may be made of a conductive material and the bottom surface of the lever arm 600 at end 604 can include one or more magnets. In such an embodiment, the magnetic plate 614, or a portion of the magnetic plate below the end 604 of the lever arm 602 may be made of a ferrous material.

Figure 8:
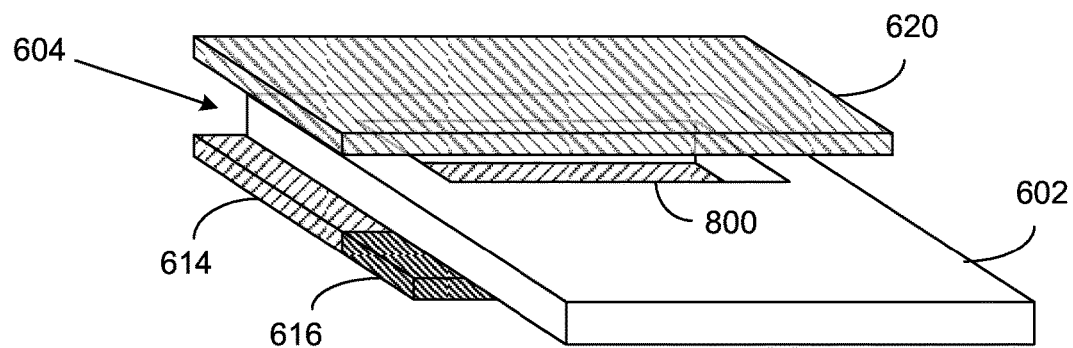
FIG. 8 is a perspective view of the switch assembly 600.
Figure 9:
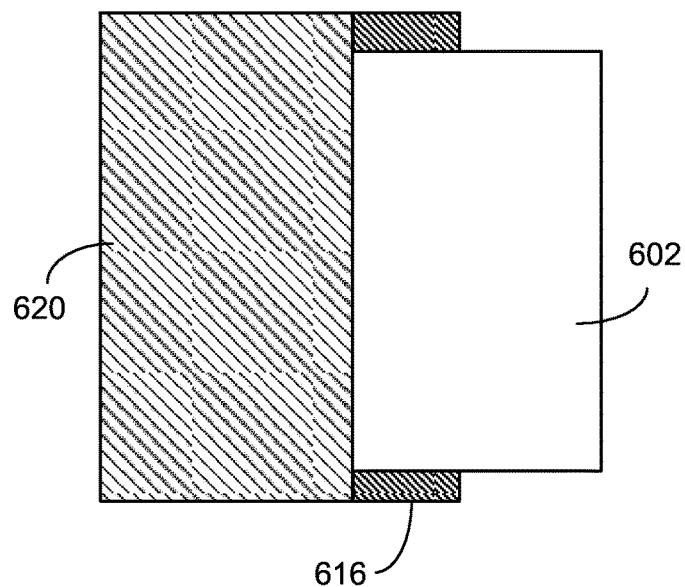
FIG. 9 is a plan view of the switch assembly 600.

FIG. 8 is a perspective view of the switch assembly 600, and FIG. 9 is a plan view of the switch assembly 600. The geometry of the lever arm can be changed to achieve a desired force displacement curve. For example, the lever arm 602 can include one or more openings 800 (see FIG. 8). The opening or openings can be positioned at any location on the lever arm. The lever arm 602 is made of less material when the lever arm includes one or more openings, so less force may be needed to detach the end 604 from the magnetic plate 614. Additionally, when at least one opening is positioned at the lever arm end 604, less material in the lever arm is magnetically attached to the magnetic plate 614 so less force is needed to detach the end 604 from the magnetic plate 614.

Additionally, in some embodiments an alignment pin (not shown) can be disposed in the opening 800 to prevent the lever arm 602 from being pulled out of the switch assembly or out of the enclosure 612.

Figure 10:
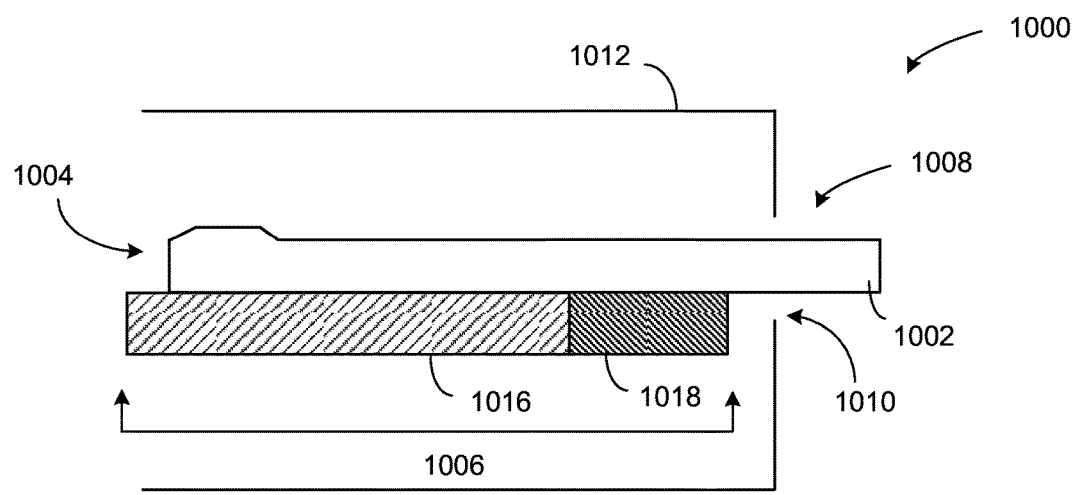
FIGS. 10-11 are cross-sectional views of another example of a switch assembly.
Figure 11:
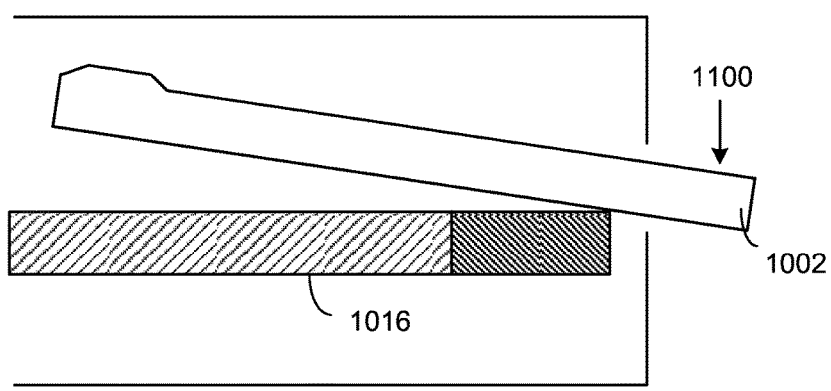

Referring now to FIGS. 10-11, there are shown cross-sectional views of another example of a switch assembly. FIG. 10 depicts the switch assembly in a "closed" or actuated state and FIG. 11 illustrates the switch assembly in an "open" or unactuated state. In some embodiments, the switch assembly 1000 can be used in the switch 108 and/or the switches 112, 114 in FIG. 1.

The switch assembly 1000 includes a lever arm 1002 having one end 1004 attached to a base plate 1006 and another end 1008 extending out of an opening 1010 in an enclosure 1012. In the illustrated embodiment, the base plate 1006 includes a contact plate 1014 (see FIGS. 12 and 13), a magnetic plate 1016, and an electrical ground plate 1018. The magnetic plate can include one or more magnets embedded in the plate or disposed on top of the plate. Alternatively, the magnetic plate 1016 may be one magnet. The lever arm 602 can be made of a ferrous and conductive material. Thus, when the switch is in the closed state, the lever arm 1002 is magnetically attached to the magnetic plate 1016.

When a force (see arrow 1100 in FIG. 11) is applied to the end 1008 of the lever arm 1002 extending out of the enclosure 1012, and the amount of force is sufficient to overcome the magnetic attraction between the lever arm 1002 and the magnetic plate 1016, the lever arm detaches from the magnetic plate 1016. When the lever arm is detached from the magnetic plate 1016, the end 1004 of the lever arm 1002 does not contact the contact plate 1014. The switch is open or unactuated when the lever arm 1002 does not contact the contact plate 1014. When the force is removed, the lever arm 1002 may return to its position on the base plate 1006 (i.e., the closed state) due at least in part to the magnetic attraction between the lever arm and the magnetic plate 1016.

Like the first example of a switch assembly, other embodiments can configure the switch assembly 1000 differently. For example, the lever arm 1002 may be made of a conductive material and the bottom surface of the lever arm 1002 above the magnetic plate 1016 can include one or more magnets. In such an embodiment, the magnetic plate 1016 may be made of a ferrous material.

Figure 12:
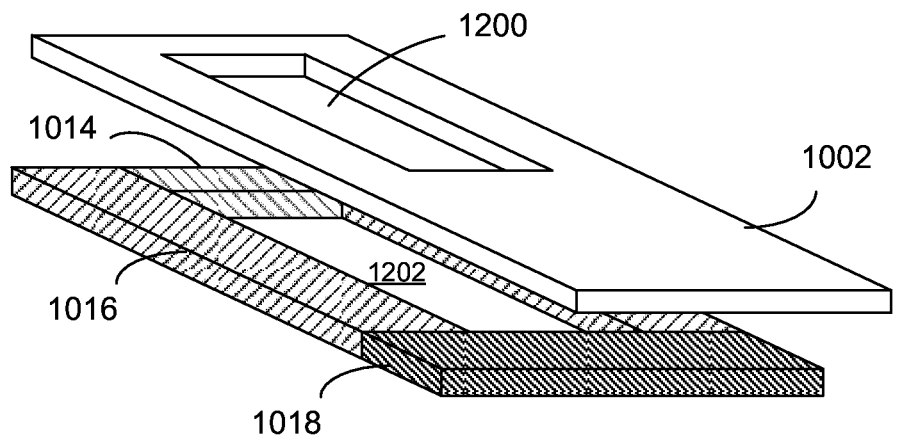
FIG. 12 is a perspective view of the switch assembly 1000.
Figure 13:
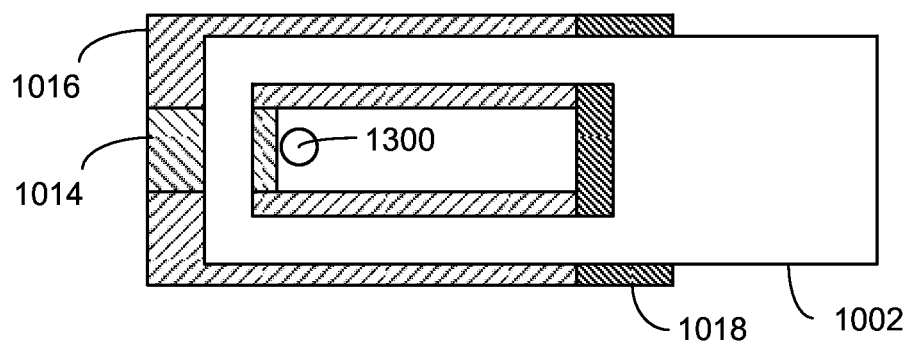
FIG. 13 is a plan view of the switch assembly 1000.

FIG. 12 is a perspective view of the switch assembly 1000, and FIG. 13 is a plan view of the switch assembly 1000. The geometry of the lever arm can be changed to achieve a desired force displacement curve. For example, the lever arm 1002 can include one or more openings 1200. The opening(s) can be positioned at any location in the lever arm. The lever arm 1002 is made of less material when the lever arm includes one or more openings. Additionally, when at least one opening is formed in the region of the lever arm above the magnetic plate 1016, less material in the lever arm is magnetically attached to the magnetic plate 1016. Less force may be needed to detach the lever arm 1002 from the magnetic plate 1016 when the lever arm includes one or more openings.

Additionally or alternatively, the magnetic plate 1016 can include one or more openings 1202 in some embodiments. The lever arm 1002 is magnetically attached to a reduced amount of material in the magnetic plate 1016, so less force may be needed to detach the lever arm 1002 from the magnetic plate 1016.

Additionally, in some embodiments one or more alignment pins 1300 (FIG. 13) can be disposed in the opening 1200 or openings 1200, 1202 to prevent the lever arm 1002 and base plate 1006 from being pulled out of the switch assembly or the enclosure 1012. The alignment pin or pins can be positioned at any given location in the opening(s).

The switching assemblies 600, 1000 may be enclosed in a structure, such as a metal structure, to shield the magnets and/or magnetic fields from the other components in the electronic device. For example, the enclosure 612 or 1012 can function as the shielding structure. As another example, the switching assemblies can be enclosed in an additional structure within the enclosure 612 or 1012.

Figure 14:
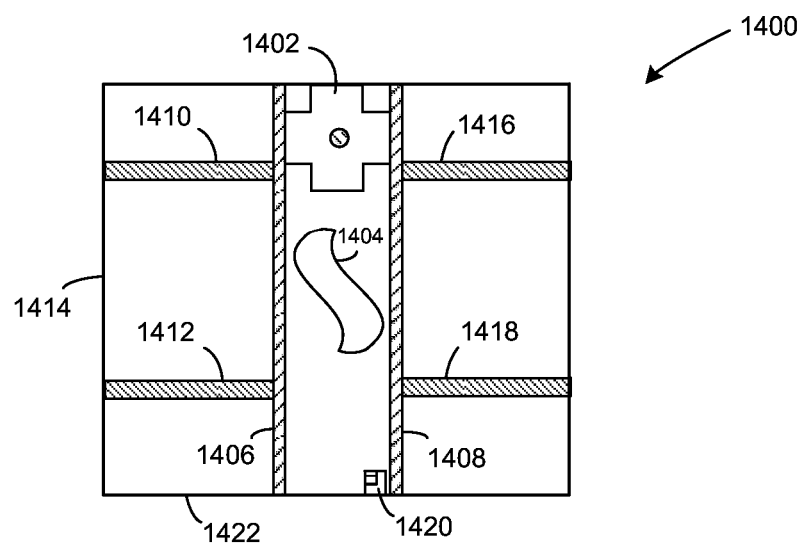
FIGS. 14-18 are cross-sectional views of the switch assembly for switch 200 taken along line 14-14 in FIG. 1 that illustrate an example operation of the switch assembly.
Figure 15:
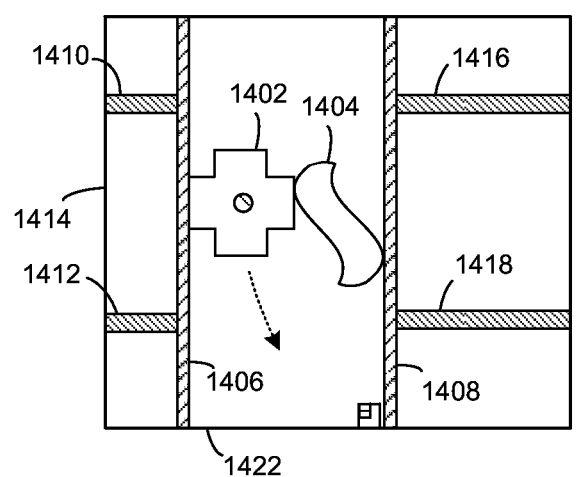
Figure 16:
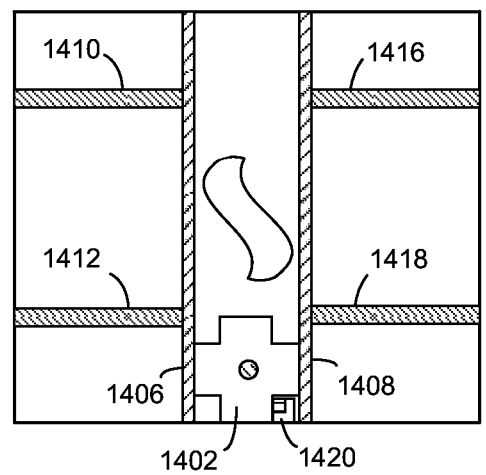

Referring now to FIGS. 14-18, there are shown cross-sectional views of the switch assembly for switch 200 taken along line 14-14 in FIG. 1 that illustrate an example operation of the switch assembly. FIG. 14 illustrates the switch in one nominal position, while FIG. 16 depicts the switch in another nominal position. The switch assembly 1400 includes an element 1402 and a guide 1404. In the illustrated embodiment, the element 1402 is movable and the guide 1404 is fixed.

Movable walls 1406, 1408 can be positioned adjacent to the sides of the element 1402. In one embodiment, the separation distance between the two movable walls is maintained during operation of the switching assembly 1400. Compliant members 1410, 1412 are positioned between the movable wall 1406 and one side of the enclosure 1414. Compliant members 1416, 1418 are positioned between the other movable wall 1408 and the other side of the enclosure 1414. In one embodiment, the compliant members 1410, 1412, 1416, 1418 are springs, but other types of compliant members can be used. A contact 1420 is positioned at the base 1422 of the enclosure 1414.

The button 200 (see FIGS. 2-3) can be operatively connected to the element 1402. In FIG. 14, the button 200 is positioned as shown in FIG. 2. The switch is "open" or unactuated when the button 200 is in the top position. When a user wants to move the button 200 to the bottom position shown in FIG. 3, the user applies a downward force to the button 200. This downward force causes the button 200 and the element 1402 to move downward. When the element 1402 contacts the guide 1404, the shape of the guide 1404 causes the element 1402 to translate to the left (as looking at FIG. 14) while moving downward (e.g., move normal to the direction of the applied force). The element 1402 moves along the rounded transition at the top left side of the guide 1404 due at least in part to the sharp transition at the top right side of the guide.

FIG. 15 illustrates the switch assembly when the element 1402 has moved about halfway toward the base 1422 of the enclosure 1414. The movable walls 1406, 1408 have moved in tandem with the element 1402, which causes the compliant members 1410, 1412 to compress and the compliant members 1416, 1418 to extend.

When the element 1402 completes its travel (FIG. 16), and the button 200 is in the position shown in FIG. 3, the movable walls 1406, 1408 return to the nominal position due to the expansion of the compliant members 1410, 1412 and to the contraction of the compliant members 1414, 1416 as the compliant members 1410, 1412, 1414, 1416 return to the nominal positions. The element 1402 electrically connects with the contact 1420, and the switch is "closed" or actuated.

When the user wants to move the button 200 to the top position shown in FIG. 2, the user applies an upward force to the button 200. This upward force causes the button 200 and the element 1402 to move up. When the element 1402 contacts the guide 1404, the shape of the guide 1404 causes the element 1402 to translate to the right (as looking at FIG. 14) while moving upward. The element 1402 moves along the rounded transition at the bottom right side of the guide 1404 due at least in part to the sharp transition at the bottom left side of the guide.

Figure 17:
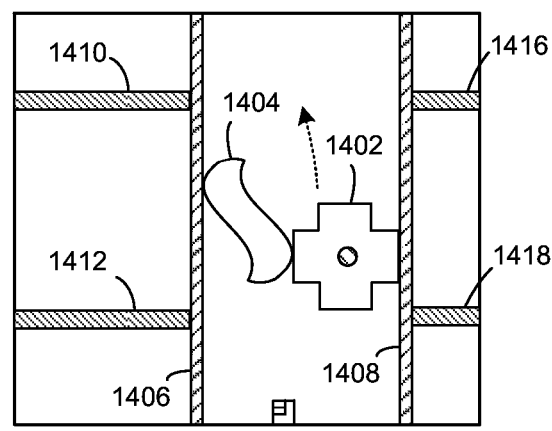
Figure 18:
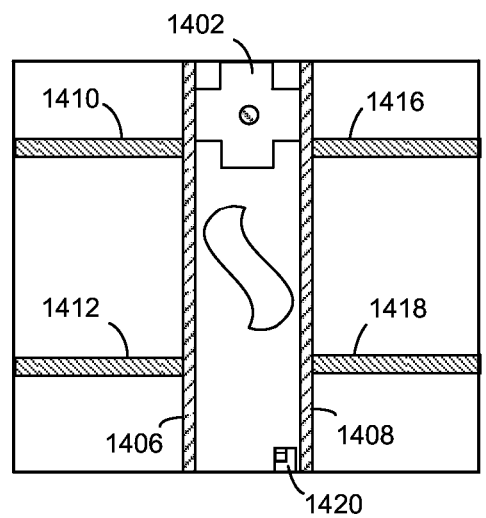

FIG. 17 illustrates the switch assembly when the element 1402 has moved about halfway up the enclosure 1414. The movable walls 1406, 1408 have moved in tandem with the element 1402, which causes the compliant members 1414, 1416 to compress and the compliant members 1410, 1412 to extend.

When the element 1402 completes its travel (FIG. 18) and the button 200 is in the position shown in FIG. 2, the movable walls 1406, 1408 return to the nominal position due to the expansion of the compliant members 1414, 1416 and to the contraction of the compliant members 1410, 1412. The switch is "open" or unactuated when the element 1402 does not contact the contact 1420.

Figure 19:
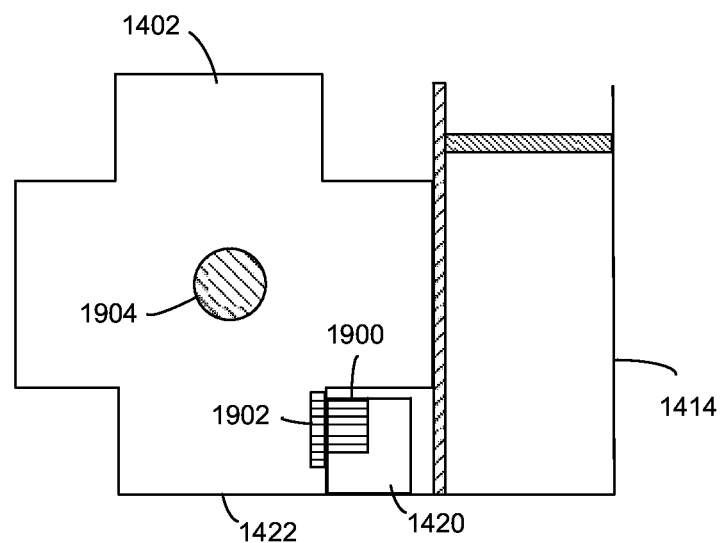
FIG. 19 is an enlarged view of the element 1402 electrically connected to the contact 1420.

Referring now to FIG. 19, there is shown an enlarged view of the element 1402 electrically connected to the contact 1420. The contact 1420 can include a conductive contact 1900. The element 1402 may also include a conductive contact 1902. In some embodiments, the base 1420 of the enclosure is an electrical ground. The base 1420 can also be made of a compliant material so the switch is always closed when the button 200 is in the bottom position (i.e., the conductive contact 1902 contacts the conductive contact 1900).

A post 1904 in the element 1402 can connect electrically to a component or components external to the switching element. The post 1904 can transmit a signal to the component(s) when the switch is closed.

In some embodiments, the element 1402 can be made of a conductive material so that the conductive contact 1902 is not needed. In another embodiment, the element 1402, or at least a portion of the element may be plated with a conductive material to produce the conductive contact that electrically connects with the conductive contact 1900. Similarly, a portion of the contact 1420 can be plated with a conductive material. And in yet another embodiment, a contact may be embedded in the guide 1404 in a location that the element 1402 contacts when the switch is actuated and remains in contact with while the switch is in the closed state.

In other embodiments, conductive material can be disposed on the bottom surface of the element 1402 and pins may be embedded in the base 1422 of the enclosure 1414. In this configuration, the switch will not close until the element 1402 completes its travel to the base of the enclosure.

The components of the switching assemblies 600, 1000, and 1400 can have any given shape and dimensions. The switching assemblies can be designed or customized to provide a given click ratio, desirable travel, and to "snap" open and/or closed at a given point in the travel. Additionally or alternatively, the switching assemblies can be designed and customized to produce to desired force displacement curve. For example, in switch assemblies 600 and 1000, the geometry of the lever arm, the base plate, the magnets (if included), and/or of the openings can be configured to produce a desired force deflection curve. Similarly, in the switch assembly 1400 the geometry of the element, the guide, and/or the contact can be designed to produce a desired force deflection curve. The number of movable walls, the number of compliant members, and/or the material of the movable walls and of the compliant members can be selected to produce a desired force deflection curve.

Figure 20:
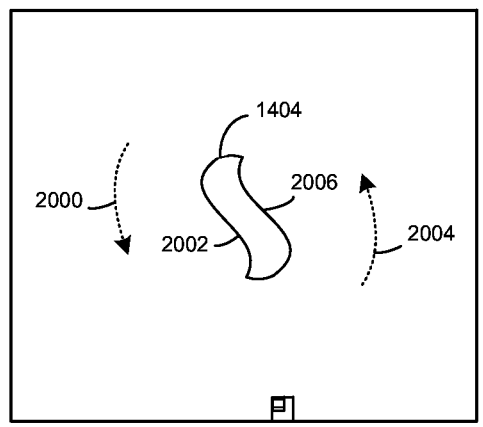
FIGS. 20-21 depict switch assemblies that produce different force displacement curves.

Turning to FIG. 20, the switch 1400 has a first force displacement curve as the element 1402 (not shown in FIG. 20) moves along a first travel path 2000. The first travel path 2000 is associated with one side 2002 of the guide 1404, and the shape of the side 2002 produces the first displacement curve. The switch 1400 has a second force displacement curve as the element moves along a second travel path 2004. The second travel path is associated with the other side 2006 of the guide 1404, and the shape of the side 2006 produces the second displacement curve. In the illustrated embodiment, the first travel path differs from the second travel path. Because the illustrated guide 1404 has symmetry (i.e., rotational symmetry), the first and second force displacement curves can be the same.

Figure 21:
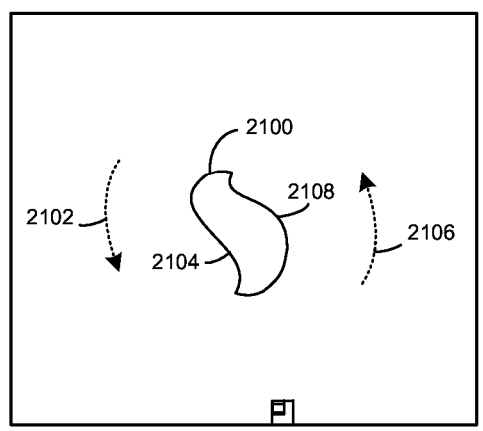

In FIG. 21, the guide 2100 is not symmetrical. A first travel path 2102 (e.g., to the contact 2104) is associated with one side 2106 of the guide 2100, and the shape of the side 2106 produces the first displacement curve. The switch has a second force displacement curve as the element moves along a second travel path 2108 (e.g., away from the contact). The second travel path is associated with the other side 2110 of the guide 2100, and the shape of the side 2110 produces the second displacement curve. In this embodiment, the first and second force displacement curves are different because the guide 2100 is not symmetrical. Thus, the shape or geometry of the guide can be customized to produce a desired force displacement curve along a first travel path and a different force displacement curve along a second travel path.

In some embodiments, the texture of at least one side of the guide can be different to produce a given friction as the element moves along a travel path. For example, one side of the guide can be sanded to create a rougher surface while the other side of the guide may have a smoother surface. The rougher surface can increase the friction as the element moves along that side compared to the other side. Additionally or alternatively, the material of the guide at one side can be different than the material at the other side to create more (or less) friction as the element moves along a respective travel path.

Additionally or alternatively, the texture of a side or region of the element can be different to produce a given friction as the element moves along a travel path. Additionally or alternatively, the material in a side or region of the element can be different than the material at another side or region of the element to create more (or less) friction as the element moves along a respective travel path. Thus, different frictions can be used to customize the force displacement curves for the travel path or paths of the element.

In other embodiments, the guide 1404 can move or rotate and the element 1402 may move vertically only (i.e., up and down). In such an embodiment, the direction of travel of the element is different but the first and second travel paths are the same path. The force displacement curves associated with each travel path can be the same or different. And in another embodiment, the guide 1404 may move (e.g., rotate or translate) and the element 1042 may move vertically, horizontally, and/or normal to the direction of the force along one or more travel paths. In such an embodiment, the travel paths of the element may be the same travel path, or the travel paths may be different. The force displacement curves associated with each travel path can be the same or different. And the force displacement curves associated with each travel path can be the same or different.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

We claim:

1. An electronic device, comprising:
   a housing defining a switch opening;
   a touch-sensitive display positioned at least partially within the housing;
   a cover attached to the housing and covering the touch-sensitive display; and
   a switch assembly at least partially within the housing and comprising:
      a base plate;
      a contact plate set apart from the base plate by a gap; and
      a lever arm positioned in the gap and magnetically attachable to at least a portion of the base plate and pivotable about a fulcrum in response to application of an external force on the lever arm,
   wherein:
      when the lever arm is magnetically attached to the base plate, the lever arm is not in contact with the contact plate;
      when the lever arm completes a circuit from the base plate to the contact plate through the lever arm, the lever arm is magnetically detached from the base plate; and
      a portion of the lever arm is accessible through the switch opening in the housing.

2. The electronic device as in claim 1, wherein the lever arm includes one or more openings formed therein.

3. The electronic device as in claim 2, further comprising an alignment pin disposed in at least one opening in the lever arm.

4. The electronic device as in claim 2, wherein the switch assembly is enclosed in a shielding structure.

5. The electronic device as in claim 1, wherein the electronic device comprises one of a smart telephone, a computer, a digital music player, a gaming device, a tablet computing device, and a wearable communication device.

6. An electronic device, comprising:
a housing defining a switch opening;
a touch-sensitive display within the housing; and
a switch assembly coupled to the housing and comprising:
 a base plate positioned within the housing;
 a contact plate positioned within the housing, and
 an arm comprising:
  a first end extending through the switch opening; and
  a second end opposite the first end;
 wherein the arm is movable between:
  a first position in which the second end is magnetically coupled to the base plate and an electrical circuit from the base plate to the contact plate is open; and
  a second position in which the second end is in contact with the contact plate, thereby electrically coupling the base plate to the contact plate through the arm to close the electrical circuit.

7. The electronic device of claim 6, wherein:
the arm is configured to pivot about a pivot axis when moved between the first position and the second position;
the first and second ends of the arm are on opposite sides of the pivot axis; and
the arm includes an opening in the first end.

8. The electronic device of claim 6, wherein the arm moves between the first position and the second position in response to an application of force on the first end of the arm.

9. The electronic device of claim 6, wherein:
the base plate comprises a ground plate; and
the arm comprises a conductive material and is in contact with the ground plate.

10. The electronic device of claim 6, wherein:
the arm comprises a magnet; and
the base plate comprises a magnetic material.

11. The electronic device of claim 6, wherein the base plate comprises a magnet.

12. The electronic device of claim 6, wherein the arm comprises a ferrous material.

13. The switch assembly of claim 1, wherein the lever arm is configured to magnetically detach from the base plate and contact the contact plate when the lever arm pivots about the fulcrum.

14. The switch assembly of claim 13, wherein the lever arm is configured to cease contacting the contact plate and magnetically reattach to the base plate when the external force is removed from the lever arm.

15. The switch assembly of claim 1, wherein:
the base plate comprises a magnet; and
the lever arm comprises a magnetic material.

16. An electronic device, comprising:
a housing having a sidewall and an opening in the sidewall;
a display within the housing;
a cover over the display;
a touch sensor within the housing and configured to detect touch inputs applied to the cover; and
a switch assembly within the housing and comprising:
 a base;
 a magnet attached to the base; and
 an arm having a first end that extends through the opening, the arm pivotable about a pivot axis in response to application of an external force on the first end of the arm; and
 a contact positioned above a second end of the arm opposite the first end of the arm, wherein:
  the switch assembly is in an unactuated state when the arm is magnetically attached to the magnet; and
  the switch assembly is in an actuated state when the arm is detached from the magnet and in contact with the contact to complete a circuit from the contact, through the arm, to the base.

17. The electronic device of claim 16, wherein:
the arm comprises an opening that overlaps the magnet; and
the opening reduces a magnetic attraction between the arm and the magnet as compared to an arm with no opening.

18. The electronic device of claim 16, wherein the arm comprises a magnetic material.

19. The electronic device of claim 16, wherein, in response to the application of the external force on the arm, the arm detaches from the magnet.

20. The electronic device of claim 19, wherein, in response to removal of the external force, the arm magnetically reattaches to the magnet.

21. The electronic device of claim 16, wherein the switch assembly is enclosed in a shielding structure.

22. The electronic device of claim 16, wherein:
the housing defines an additional opening in the sidewall; and
the electronic device further comprises:
 an additional switch assembly within the housing and comprising:
  an additional magnet attached to an additional base; and
  an additional arm magnetically attachable to the additional magnet and pivotable about an additional pivot axis in response to application of an additional external force on a first end of the additional arm; and
 an additional contact positioned above a second end of the additional arm opposite the first end of the additional arm.

23. The electronic device of claim 22, wherein:
the additional switch assembly is in an unactuated state when the additional arm is magnetically attached to the additional magnet; and
the additional switch assembly is in an actuated state when the additional arm is detached from the additional magnet and in contact with the additional contact to complete a circuit from the additional contact, through the additional arm, to the additional base.

24. The electronic device of claim 23, further comprising a speaker.

25. The electronic device of claim 24, wherein:
actuation of the switch assembly is configured to increase a volume of an audio output of the speaker; and
actuation of the additional switch assembly is configured to decrease the volume of the audio output of the speaker.

* * * * *